United States Patent
Choi (10) Patent No.: US 8,941,696 B2
(45) Date of Patent: Jan. 27, 2015

(54) LIQUID CRYSTAL DISPLAY DEVICE INCLUDING INSPECTION CIRCUIT AND INSPECTION METHOD THEREOF

(71) Applicant: LG Display Co., Ltd., Seoul (KR)

(72) Inventor: MoonJung Choi, Seoul (KR)

(73) Assignee: LG Display Co., Ltd., Seoul (KR)

( * ) Notice: Subject to any disclaimer, the term of this patent is extended or adjusted under 35 U.S.C. 154(b) by 63 days.

(21) Appl. No.: 13/728,433

(22) Filed: Dec. 27, 2012

(65) Prior Publication Data

US 2014/0078187 A1    Mar. 20, 2014

(30) Foreign Application Priority Data

Sep. 14, 2012    (KR) .................. 10-2012-0102447

(51) Int. Cl.
*G09G 3/00* (2006.01)
*G09G 3/36* (2006.01)

(52) U.S. Cl.
CPC .............. *G09G 3/006* (2013.01); *G09G 3/00* (2013.01); *G09G 3/36* (2013.01)
USPC ................................ 345/690; 345/87; 345/92

(58) Field of Classification Search
None
See application file for complete search history.

(56) References Cited

U.S. PATENT DOCUMENTS

2012/0154369 A1*    6/2012    Yamauchi ..................... 345/212

FOREIGN PATENT DOCUMENTS

| TW | 200428345 | 12/2004 |
|----|-----------|---------|
| TW | 200949401 A | 12/2009 |
| TW | 201218177 A | 5/2012 |

OTHER PUBLICATIONS

Copy of Office Action issued in Taiwanese Patent Application No. 101149201, mailed Sep. 24, 2014, 7 pages.

* cited by examiner

*Primary Examiner* — Joseph Haley
*Assistant Examiner* — Emily Frank
(74) *Attorney, Agent, or Firm* — Brinks, Gilson & Lione (57) ABSTRACT

Disclosed is an LCD device having a structure such as a column inversion type or a Z-inversion type where a single data line can be shared by two neighboring pixels, and an inspection circuit and method thereof. The inspection circuit for outputting gate driving signals in a division manner into odd and even-numbered signals is provided between the gate driving unit and a pixel region, so that only color pixels to be inspected can be driven. This can allow pixels to be normally inspected in an LCD device having an enhanced column inversion structure.

6 Claims, 7 Drawing Sheets

LIQUID CRYSTAL DISPLAY DEVICE INCLUDING INSPECTION CIRCUIT AND INSPECTION METHOD THEREOF

CROSS-REFERENCE TO RELATED APPLICATION

Pursuant to 35 U.S.C. §119(a), this application claims the benefit of earlier filing date and right of priority to Korean Application No. 10-2012-0102447, filed on Sep. 14, 2012, the contents of which is incorporated by reference herein in its entirety.

BACKGROUND

1. Field of the Disclosure

The present disclosure relates to a liquid crystal display (LCD) device, and particularly, to an LCD device including an inspection circuit, the device having a structure such as a column inversion type or a Z-inversion type where a single data line can be shared by two neighboring pixels, and an inspection method thereof.

2. Background of the Disclosure

With development of information electronic devices including various types of portable devices such as a mobile phone and a notebook computer, an HDTV, etc. for implementing images of high resolution and high quality, demands for flat panel display devices applied thereto increase. Such flat panel display devices include LCD (Liquid Crystal Display), PDP (Plasma Display Panel), FED (Field Emission Display), OLED (Organic Light Emitting Diodes), etc. However, among such flat panel display devices, the LCD devices are spotlighted because of characteristics of massive production, easy driving, high quality, and a large screen.

An active matrix-type LCD device where a thin film transistor (TFT) is used as a switching device, is particularly suitable for displaying moving images.

Generally, the LCD device for displaying images has a column inversion structure, a line inversion structure and a dot inversion structure, so as to prevent degradation of liquid crystals and to enhance a picture quality. The dot inversion structure has a higher picture quality than the column inversion or the line inversion. However, the dot inversion structure has high power consumption and lowering of a pixel charging characteristic, because a data signal applied to each data line should be inversed per horizontal period. On the contrary, the column inversion structure has an advantage that a pixel charging characteristic is excellent because data signals of the same polarity are applied data lines for each horizontal period. However, the column inversion structure has a disadvantage that inferiority of vertical cross torque may occur because pixels on the same vertical line have the same polarity.

In order to solve such problems of the column inversion structure and the dot inversion structure, has been proposed an enhanced column inversion structure.

Figure 1A:
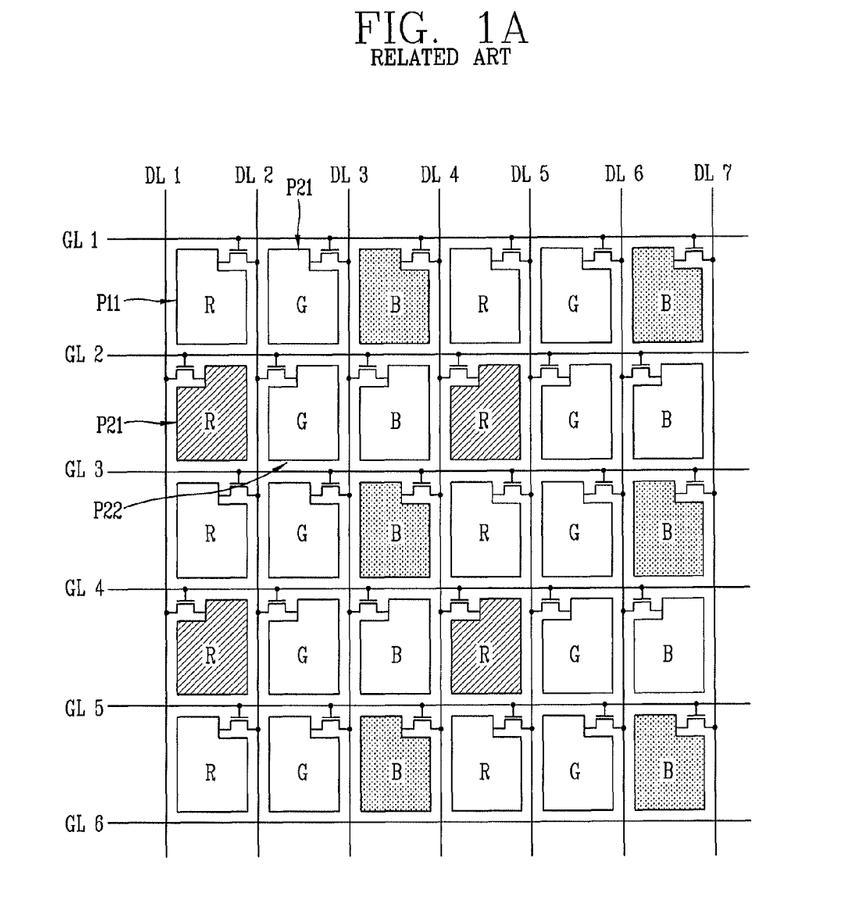
FIGS. 1A and 1B are views showing part of an LCD device having an enhanced column inversion structure in accordance with the conventional art.
Figure 1B:
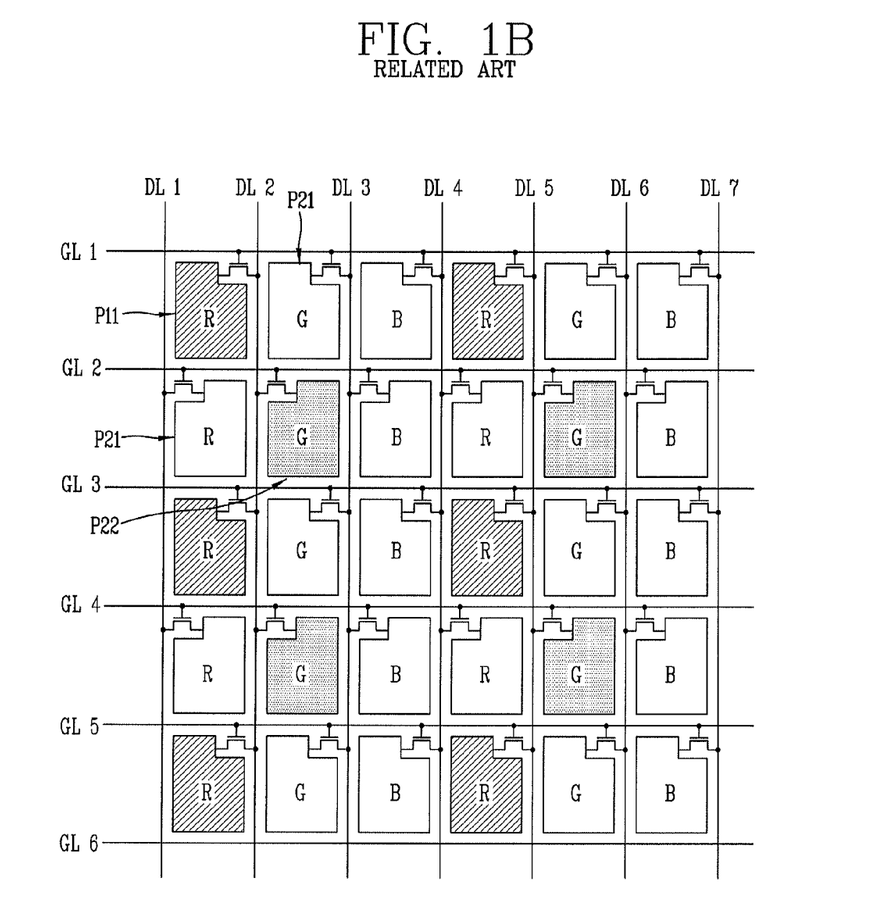

FIGS. 1A and 1B are views showing part of an LCD device having an enhanced column inversion structure in accordance with the conventional art.

As shown, the conventional LCD device having an enhanced column inversion structure includes a plurality of gate lines (GL1~GL6) and data lines (DL1~DL7) crossing each other, and a plurality of pixels (P11~P22) formed at the crossing points. Pixels (P11,P21) arranged on the same horizontal line are connected to the same gate line (GL1), and pixels (P11,P12) arranged on the same vertical line are connected to different data lines (DL1,DL2).

The LCD device having such enhanced column inversion structure operates in the same manner as an LCD device having a general column inversion structure, by alternately applying data signals of a positive polarity (+) and a negative polarity (−) to neighboring data lines in a normal mode, and by inversing the polarities of the data signals per frame. However, the enhanced column structure has the same effect as the dot inversion structure because the upper and lower pixels (P11, P22) arranged to cross each other are connected to a single data line (DL1).

Accordingly, the enhanced column inversion structure can implement the same picture quality as the dot inversion structure, with obtaining a sufficient charging time for each pixel.

However, the LCD device having such column inversion structure has a difficulty in inspecting whether each pixel is normally driven. For instance, as shown in FIG. 1A, high gate driving signals (VGH) are applied to all of the gate lines (GL1~GL6), so as to inspect whether R pixels are normally driven. A gate driving unit (not shown) for supplying signals to the gate lines (GL1~GL6) has a GIP (Gate In Panel) structure. According to the GIP structure, the gate driving unit is mounted on an LC panel together with pixels through the same processes. Such gate driving unit has a structure where a plurality of shift registers sequentially operate, and is driven by sequentially or simultaneously applying high gate driving signals (VGH) to the respective gate lines (GL1~GL6).

If the high gate signals (VGH) are simultaneously applied to all of the gate lines (GL1~GL6), transistors (T) of all pixels are turned-on. And, full-gray data signals are applied to data lines (DL1, DL4, DL7) connected to R pixels, among all of the data lines (DL1~DL7). The data driving unit is not mounted in an LC panel, but is attached to the LC panel in the form of a separate integrated chip (IC). And, the data driving unit may individually apply signals to the data lines (DL1~DL7). Accordingly, for inspection of specific pixels, data signals are applied only to data lines connected to the specific pixels. However, even if data signals are applied only to the data lines (DL1, DL4, DL7) connected to the R pixels, color mixture may occur because the R pixels are together driven with B pixels also connected to the data lines (DL1, DL4, DL7). This may cause a pattern with respect to a single color not to be implemented.

Further, if full-gray data signals are applied to data lines (DL2, D5) connected to other R pixels or G pixels for inspection of said other R pixels or G pixels, said other R pixels and G pixels are together driven to cause color mixture. This may cause a difficulty in precisely inspecting whether each pixel is normally driven or not.

SUMMARY

A liquid crystal display (LCD) device, comprises: an LC panel having a plurality of gate lines and data lines crossing each other, and having a plurality of pixels defined at the crossing points; a gate driving unit mounted at one side of the LC panel, and configured to output gate driving signals to the gate lines; a data driving unit configured to output a data signal to the data lines; and an inspection circuit unit formed between the gate lines and the gate driving unit, and configured to output gate driving signals in an alternating manner per ½ frame in the unit of odd-numbered or even-numbered gate lines, in correspondence to inspection control signals in an inspection mode.

There is also provided an inspection method of a liquid crystal display (LCD) device having an inspection circuit unit on an LC panel, the inspection circuit unit formed between gate lines of the LC panel and a gate driving unit, and the inspection circuit unit configured to output gate driving signals in an alternating manner in the unit of odd-numbered or even-numbered gate lines, in correspondence to inspection control signals in an inspection mode, the method comprising: driving the odd-numbered gate lines for a ½ frame; applying full-gray data signals to data lines connected to pixels corresponding to a single color, among pixels connected to the odd-numbered gate lines; driving the even-numbered gate lines for a ½ frame; and applying full-gray data signals to data lines connected to the pixels corresponding to a single color, among pixels connected to the even-numbered gate lines.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE EXEMPLARY EMBODIMENTS

A description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a liquid crystal display (LCD) device including an inspection circuit according to the present invention will be explained in more detail with reference to the attached drawings.

Figure 2:
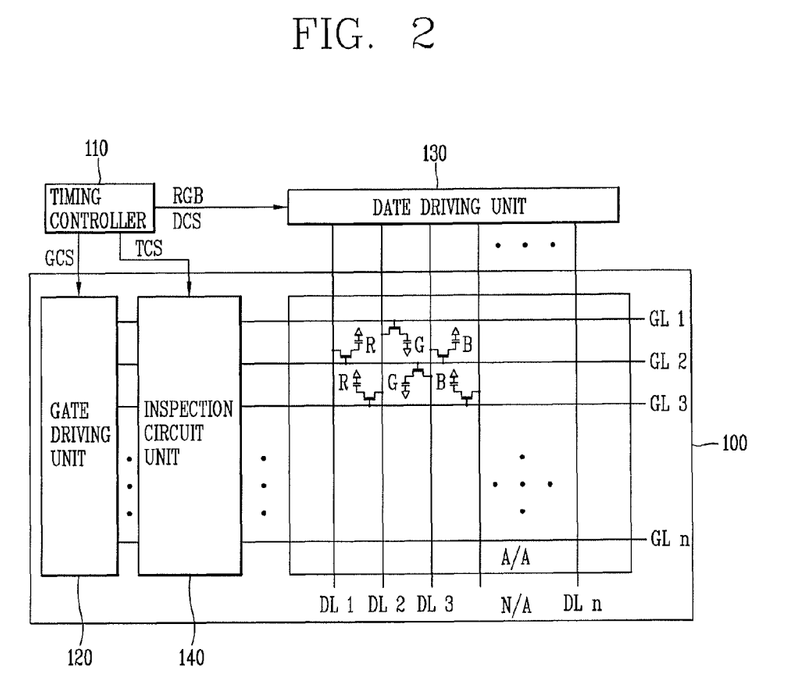
FIG. 2 is a view showing an entire structure of an LCD device according to an embodiment of the present invention.

FIG. 2 is a view showing an entire structure of an LCD device according to an embodiment of the present invention.

As shown, the LCD device according to the present invention includes an LC panel 100 configured to display images, a timing controller 110 configured to supply image signals and control signals received from an external system to each driving circuit, a gate driving unit 120 mounted at one side of the LC panel 100 and configured to drive pixels, a data driving unit 130 configured to apply a data signal to each pixel, and an inspection circuit unit 140 provided between the gate driving unit 120 and the pixels and configured to control each pixel in the unit of a horizontal line.

The LC panel 100 includes a plurality of gate lines (GL1~GLn) and a plurality of data lines (DL1~DLn) crossing each other in the form of matrices on a substrate formed of glass, and a plurality of pixels formed at the crossing points. Such LC panel 100 has a active area (A/A) where pixels including thin film transistors are formed, and a non-active area (N/A) formed to enclose the active area (A/A). The gate driving unit 120 and the inspection circuit unit 140 are mounted on the non-active area (N/A).

A plurality of pixels corresponding to three colors (R, G, B) are implemented on the active area (A/A) in the form of matrices. Each pixel includes at least one TFT and at least one LC capacitor, thereby displaying images.

A gate electrode of the TFT is connected to one of the gate lines (GL1~GLn), and a source electrode of the TFT is connected to one of the data lines (DL1~DLn). And, a drain electrode of the TFT is connected to a pixel electrode facing a common electrode, thereby defining a single pixel. An active layer of the TFT is generally formed of amorphous silicon. However, in the LCD device where the gate driving unit 120 is mounted, the active layer of the TFT may be formed of poly silicon. Accordingly, the gate driving unit 120 and the inspection circuit unit 140 to be later explained may be configured as a poly silicon thin film transistor.

Especially, in the LCD device having an enhanced column inversion structure, pixels arranged on the same horizontal line on the active area (A/A) are connected to the same gate line, and pixels arranged on the same vertical line are connected to different data lines.

The timing controller 110 receives digital image signals (RGB) received from an external system, and timing signals (not shown) such as horizontal synchronization signals (Hsync), vertical synchronization signals (Vsync), and data enable signals (DE). Based on the received signals, the timing controller 110 generates control signals of the gate driving unit 120, the data driving unit 130 and the inspection circuit unit 140.

Especially, gate control signals (GCS) supplied to the gate driving unit 120 include gate start pulse (GSP), gate shift clock (GSC), gate output enable (GOE), etc. The GSP is a signal for determining a time when a gate driving signal is output to the first gate line (GL), which is applied to a shift register (not shown) of the gate driving unit 120. The GSC is a clock signal commonly applied to each shift register, and the next shift register is activated in synchronization with the GSC. And, the GOE is a signal for controlling outputs of the shift registers.

The timing controller 110 is configured to generate data control signals (DCS) of the data driving unit 130. The DCS include source start pulse (SSP), source shift clock (SSC), source output enable (SOE), etc.

The SSP is a signal for determining a sampling start time with respect to image data of the data driving unit 130. The SSC is a clock signal for controlling a data sampling operation by the data driving unit 130. And, the SOE is a signal for controlling an output of the data driving unit 130.

The timing controller 110 receives image signals (RGB) by a general interface method, and outputs the received image signals (RGB) in an aligning manner so as to be processed by the data driving unit 130.

The timing controller 110 generates inspection control signals (TCS) for controlling the inspection circuit unit 140. The TCS include odd-number control signals (ODS) for controlling outputs of gate lines (GL1, GL3, GL(2n−1) corresponding to odd-numbered horizontal lines, and even-number control signals (EDS) for controlling outputs of gate lines (GL2, GL(2n)) corresponding to even-numbered horizontal lines.

The ODS and EDS may have the same voltage level as a high gate signal (VGH) or a low gate signal (VGL), or may have the same voltage level as a power voltage (VDD) or a ground voltage (VSS). The ODS and the EDS are set to maintain a low level or a ground voltage level in a normal mode, but to have different phases in an inspection mode. In a discharge mode, the ODS and the EDS are set to maintain a high level or a power voltage level.

That is, if the ODS have a high level in an inspection mode, the EDS are output as a low level. On the other hand, if the ODS have a low level in an inspection mode, the EDS are output as a high level.

The gate driving unit 120 sequentially outputs gate driving signals through the gate lines (GL1~GLn) formed on the LC panel 100, for a single horizontal period (1H), in response to the gate control signals (GCS) input from the timing controller 110 in a normal mode. Accordingly, a thin film transistor (T) connected to a corresponding gate line (GL) is turned-on. At the same time, the data driving unit 130 applies received analogue data signals to pixels connected to the thin film transistor (T) through data lines (DL). The gate driving unit 120 maintains a stopped state, without outputting signals to the gate lines (GL1~GLn) in an inspection mode.

The data driving unit 130 converts aligned digital image signals (RGB) into analogue data signals (VD) based on a reference voltage (Vref), the digital image signals (RGB) input in response to data control signals (DCS) input from the timing controller 110 in a normal mode. The data signals (VD) are latched per single horizontal line, and are simultaneously input to the LC panel 100 through all of the data lines (D1~DLn) for a single horizontal period (1H).

Especially, the data driving unit 130 supplies data signals for RGB pixels to the data lines (DL1~DLn) in a division manner, in an inspection mode. The data driving unit 130 divides data signals for pixels of a single color in the unit of a ½ frame, and synchronizes the divided data signals with the inspection control signals (TCS) to thus output to the data lines (DL1~DLn).

The inspection circuit unit 140 is formed between output terminals of the gate driving unit 120 and the gate lines (GL1~GLn), and transmits an output of the gate driving unit 120 to the gate lines (GL1~GLn). Here, the inspection circuit unit 140 alternately applies high gate signals to the odd-numbered gate lines {GL1, GL3, GL(2n-1)} and even-numbered gate lines {GL2, GL4, GL(2n)}, per ½ frame, in correspondence to inspection control signals (TCS) in an inspection mode of the LC panel 100. Then, the data driving unit 130 transmits, data signals corresponding to each pixel, per ½ frame, to corresponding data lines.

Under such configuration, only thin film transistors (TFTs) of pixels connected to odd-numbered gate lines are turned-on for a first ½ frame, and full-gray data signals are applied to only data lines connected to the pixels. Since pixels are alternately connected to different data lines on the same vertical line, only pixels of a single color corresponding to odd-numbered horizontal lines are driven. Further, only thin film transistors (TFTs) of pixels connected to even-numbered gate lines are turned-on for a second ½ frame, and full-gray data signals are applied to only data lines connected to the pixels. As a result, only pixels of a single color corresponding to even-numbered horizontal lines are driven. Accordingly, an inspection whether each pixel is normally driven, can be easily performed.

Hereinafter, will be explained a method for driving an LCD device including an inspection circuit in an inspection mode, according to the present invention with reference to the attached drawings.

Figure 3A:
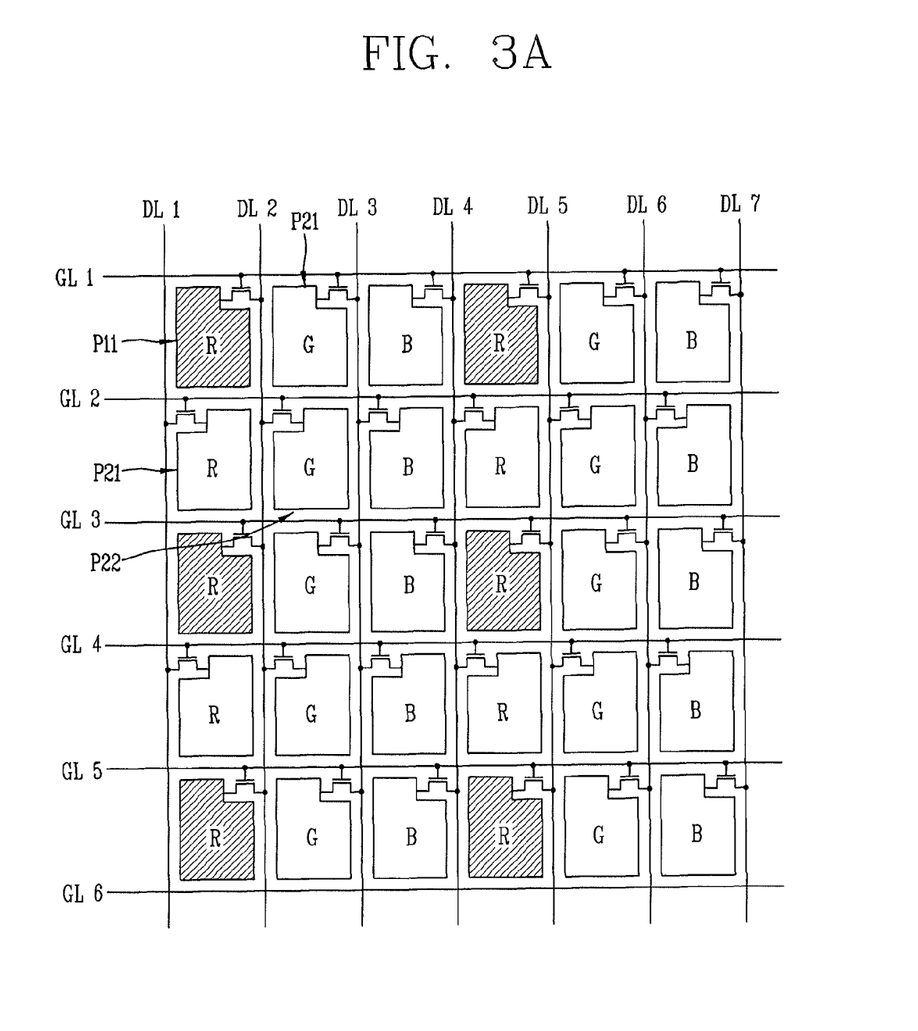
FIGS. 3A and 3B are views showing a pixel driving type in an inspection mode of an LCD device including an inspection circuit according to an embodiment of the present invention.
Figure 3B:
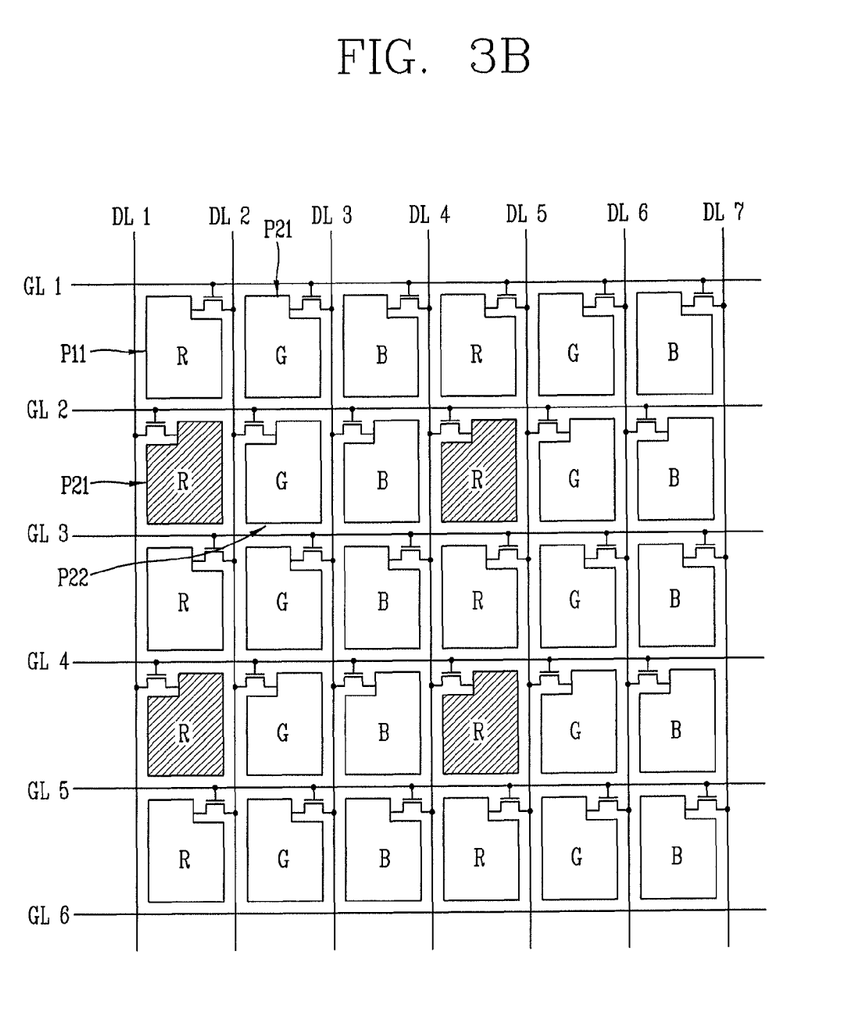

FIGS. 3A and 3B are views showing a pixel driving type in an inspection mode of an LCD device including an inspection circuit according to the present invention.

As shown, the LCD device having an enhanced column inversion structure according to the present invention includes a plurality of gate lines (GL1~GL6) and data lines (DL1~DL7) crossing each other, and a plurality of pixels (P11~P22) formed at the crossing points. Pixels (P11,P21) arranged on the same horizontal line are connected to the same gate line (GL1), and pixels (P11,P12) arranged on the same vertical line are connected to different data lines (DL1, DL2).

Referring to FIG. 3A, in case of inspecting R pixels, inspection control signals (TCS) in which odd-numbered control signals (ODS) have a high level, are applied to the inspection circuit unit, for a first ½ frame. Then, the inspection circuit unit applies high gate signals to the odd-numbered gate lines (GL1, GL3, G5), so that all pixels connected to the odd-numbered gate lines (GL1, GL3, G5) are conducted.

Then, the data driving unit applies full-gray data signals to second and fifth data lines (DL2, DL5), among data lines connected to the R pixels. Accordingly, the R pixels connected to the odd-numbered gate lines (GL1, GL3, G5) and the second and fifth data lines (DL2, DL5) are driven in a full-gray mode.

Referring to FIG. 3B, inspection control signals (TCS) in which even-numbered control signals (EDS) have a high level, are applied to the inspection circuit unit for a second ½ frame. Then, the inspection circuit unit applies high gate signals to the even-numbered gate lines (GL2, GL4, G6), so that all pixels connected to the even-numbered gate lines (GL2, GL4, G5) are conducted.

Then, the data driving unit applies full-gray data signals to first, fourth and seventh data lines (DL1, DL4, DL7), among data lines connected to the R pixels. Accordingly, the R pixels connected to the even-numbered gate lines (GL2, GL4, G6) and the first, fourth and seventh data lines (DL1, DL4, DL7) are driven in a full-gray mode.

Under such configuration, all the R pixels are sequentially driven in a full-gray mode for a single frame, so that whether the R pixels are normally driven can be inspected.

An inspection method of a liquid crystal display (LCD) device according to the present invention includes: driving odd-numbered gate lines for a ½ frame; applying full-gray data signals to data lines connected to pixels corresponding to a single color, among pixels connected to the odd-numbered gate lines; driving even-numbered gate lines for a ½ frame; and applying full-gray data signals to data lines connected to the pixels corresponding to a single color, among pixels connected to the even-numbered gate lines.

Although not shown, in case of inspecting G pixels, G pixels connected to odd-numbered gate lines (GL1, GL3, GL5) and third and sixth data lines (DL3, DL6) are driven in a full-gray mode for a first ½ frame. And, G pixels connected to even-numbered gate lines (GL2, GL4, GL6) and second and fifth data lines (DL2, DL5) are driven in a full-gray mode for a second ½ frame. In case of inspecting B pixels, B pixels connected to odd-numbered gate lines (GL1, GL3, GL5) and fourth and seventh data lines (DL4, DL7) are driven in a full-gray mode for a first ½ frame. And, B pixels connected to even-numbered gate lines (GL2, GL4, GL6) and third and sixth data lines (DL3, DL6) are driven in a full-gray mode for a second ½ frame.

Hereinafter, a structure of an inspection circuit according to the present invention will be explained with reference to the attached drawings.

Figure 4:
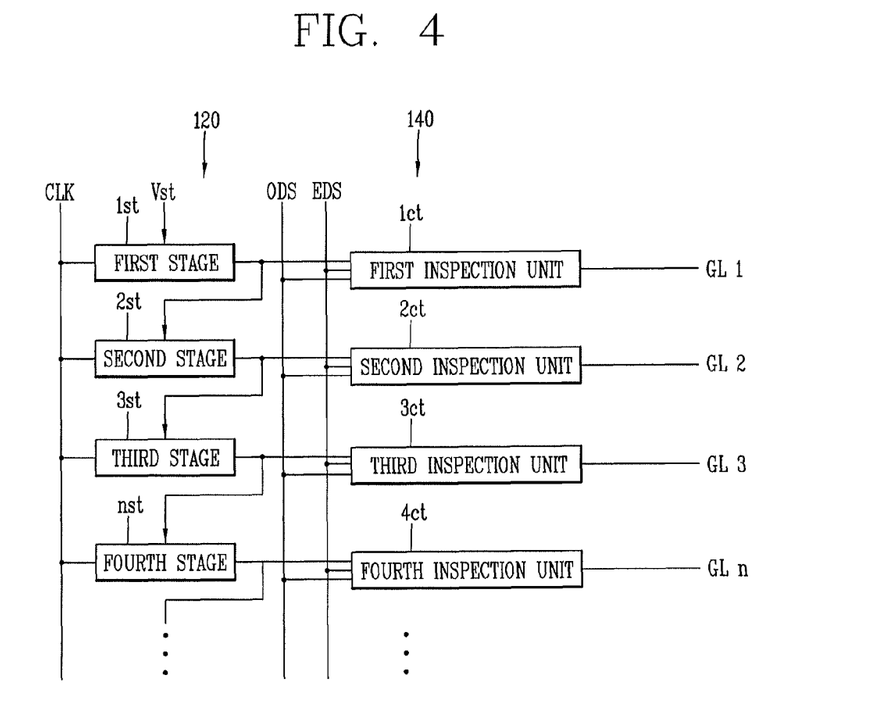
FIG. 4 is a view showing part of an LCD device including an inspection circuit according to an embodiment of the present invention.

FIG. 4 is a view showing part of an LCD device including an inspection circuit according to the present invention.

As shown, the LCD device including an inspection circuit comprises a gate driving unit 120 mounted on an LC panel, and an inspection circuit 140 provided between the gate driving unit 120 and gate lines (GL1~GLn).

The gate driving unit 120 has a plurality of stages (1st~nst) for sequentially outputting gate driving signals by receiving prescribed clock signals (CLK). The first stage (1st) is initially driven according to a start signal (Vst), and other stages (2st~nst) are driven by receiving outputs from the previous stages (1st~n−1st) as start signals.

The inspection circuit 140 has a plurality of inspection units (1ct~nct) connected to output terminals of the plurality of stages one to one, respectively. Each inspection unit outputs gate driving signals to the gate lines (GL1~GLn) in correspondence to odd-numbered inspection signals (ODS) and even-numbered inspection signals (EDS).

Under such configuration, when the LCD is in a normal mode, both odd-numbered inspection signals (ODS) and even-numbered inspection signals (EDS) are output as a low level, so that all of the inspection units (1ct~nct) are not operated. When the LCD is in an inspection mode, both odd-numbered inspection signals (ODS) and even-numbered inspection signals (EDS) are alternately output as a high level and a low level, with inversed phases per ½ frame.

As an example, in an inspection mode, the gate driving unit 120 is not operated. For a first ½ frame, if odd-numbered inspection signals (ODS) have a high level, even-numbered inspection signals (EDS) are output as a low level. The odd-numbered inspection units (2n−1 ct) output gate driving signals of a high level to the odd-numbered gate lines (GL1, GL2n−1). For a second ½ frame, odd-numbered inspection signals (ODS) are output to a low level, and even-numbered inspection signals (EDS) are output to a high level. As a result, the even-numbered inspection units (2n ct) output gate driving signals of a high level to the even-numbered gate lines (GL2, GL2n).

Figure 5:
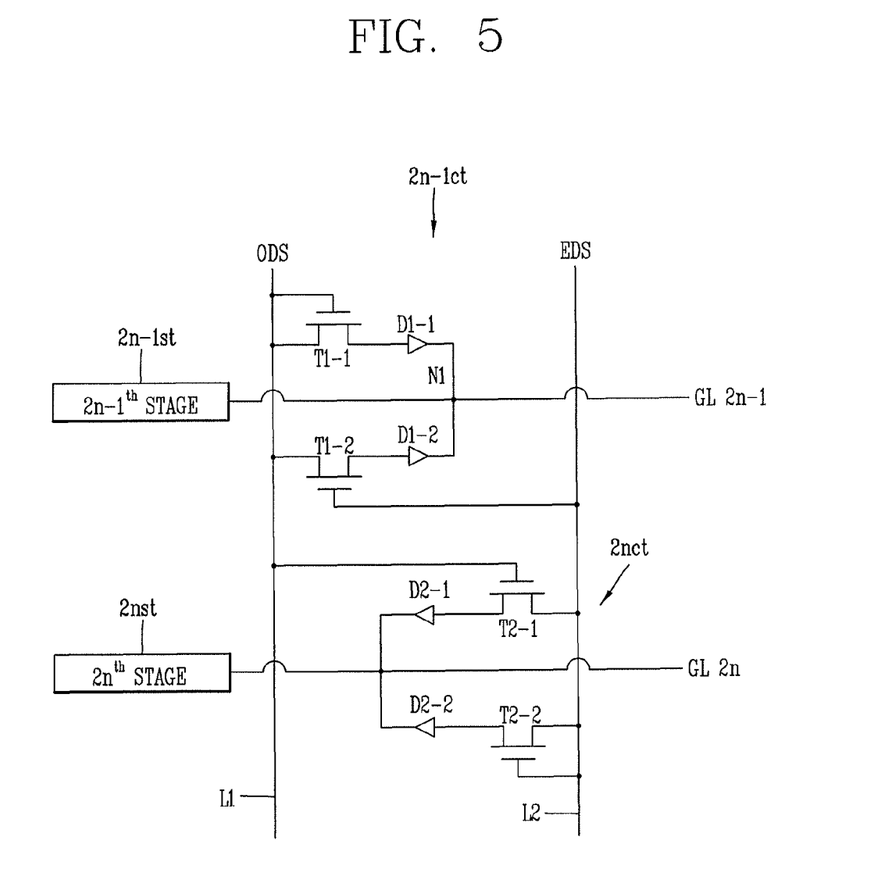
FIG. 5 is a view showing an example of a device having two neighboring inspection units in the inspection circuit of FIG. 4.

FIG. 5 is a view showing an example of a device having two neighboring inspection units in the inspection circuit of FIG. 4.

As shown, the inspection circuit for an LCD device according to the present invention includes an odd-numbered inspection unit (2n−1ct) connected between an odd-numbered stage (2n−1 st) and an odd-numbered gate line (GL 2n−1) of the gate driving unit 140, and an even-numbered inspection unit (2n ct) connected between an even-numbered stage (2n st) and an even-numbered gate line (GL 2n) of the gate driving unit 140.

Each inspection unit is connected to a first line (1L) to which odd-numbered inspection signals (ODS) are applied, and a second line (2L) to which even-numbered inspection signals (EDS) are applied. A single inspection unit includes at least two transistors and diodes, and is connected to a single gate line so that the inspection units can be symmetric to each other based on a single node.

More specifically, the odd-numbered inspection unit (2n−1 ct) includes a $1\text{-}1^{th}$ transistor (T1-1) having a gate and a source connected to the first line (L1); a $1\text{-}1^{th}$ diode (D1-1) having a cathode connected to a drain of the $1\text{-}1^{th}$ transistor (T1-1), and having an anode connected to a first node (N1); a $1\text{-}2^{th}$ transistor (T1-2) having a gate connected to the second line (L2), and having a source connected to the first line (L1); and a $1\text{-}2^{th}$ diode (D1-2) having a cathode connected to a drain of the $1\text{-}2^{th}$ transistor (T1-2), and having an anode connected to the first node (N1). Here, the first node (N1) is connected to output terminals of an odd-numbered stage (2n−1 st) and an odd-numbered gate line (GL 2n−1).

The even-numbered inspection unit (2n ct) has a symmetrical structure to the odd-numbered inspection unit (2n−1 ct). That is, the even-numbered inspection unit (2n ct) includes a $2\text{-}1^{th}$ transistor (T2-1) having a source connected to the second line (L2) and having a drain connected to a second node (N2) through a $2\text{-}1^{th}$ diode (D2-1); and a $2\text{-}2^{th}$ transistor (T2-2) having a source connected to the second line (L2) and having a drain connected to the second node (N2) through a $2\text{-}2^{th}$ diode (D2-2). Here, the second node (N2) is connected to output terminals of an even-numbered stage (2n st) and an even-numbered gate line (GL 2n).

A method for driving the inspection circuit will be explained.

Firstly, for a ½ frame, an inspection control signal (ODS) of a high level is applied to the first line (L1), and an inspection control signal (EDS) of a low level is applied to the second line (L2). As a result, the $1\text{-}1^{th}$ transistor (T1-1) is turned on, so that the first node (N1) can be charged to have a high level, and high gate driving signals can be output to the odd-numbered gate lines (GL 2n−1). The $1\text{-}2^{th}$ transistor (T1-2) and the $2\text{-}2^{th}$ transistor (T2-2) are turned-off, and the $2\text{-}1^{th}$ transistor (T2-1) is turned-on. However, since the second node (N2) is discharged as a voltage applied to the source of the $2\text{-}1^{th}$ transistor (T2-1) has a low level, low gate driving signals are output to the even-numbered gate lines (GL 2n).

Next, for a ½ frame, an inspection control signal (ODS) of a low level is applied to the first line (L1), and an inspection control signal (EDS) of a high level is applied to the second line (L2). As a result, the $2\text{-}2^{th}$ transistor (T2-2) is turned on, so that the second node (N2) is charged to have a high level, and high gate driving signals are output to the even-numbered gate lines (GL 2n). The $1\text{-}2^{th}$ transistor (T1-2) is turned-on, so that the first node (N1) can be discharged, and low gate driving signals can be output to the odd-numbered gate lines (GL 2n−1).

Under such configuration, the gate lines (GL 2n−1, GL 2n) are alternately driven per ½ frame, and then data signals are applied to pixels for inspection whether the pixels are normally operated or not.

In case of applying a high level to both of the first line (L1) and the second line (L2), all the gate lines (GL 2n−1, GL 2n) are simultaneously driven. This can allow a discharge circuit function to be implemented.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device, comprising:
an LC panel having a plurality of gate lines and data lines crossing each other, and having a plurality of pixels defined at the crossing points;
a gate driving unit mounted at side of the LC panel, and configured to output a gate driving signal to the gate lines;
a data driving unit configured to output a data signal to the data lines; and
an inspection circuit unit formed between the gate lines and the gate driving unit and configured to output gate driving signals to the odd-numbered gate lines in correspond to a first inspection signal and to the even-numbered gate lines in correspond to a second inspection signal in an alternative manner in an inspection mode,
wherein the plurality of pixels are configured such that neighboring pixels on the same vertical line are connected to different data lines,
wherein the first inspection signal is applied, first nodes connected to the odd-numbered gate lines are charged and second nodes connected to the even-numbered gate lines are discharged.

2. The LCD device of claim 1, wherein the first inspection signal and the second inspection signal have phases switched from each per other ½ frame.

3. The LCD device of claim 1, wherein each of the first inspection signal and the second inspection signal are voltage signals having the same level as a high gate signal (VGH) or a low gate signal (VGL).

4. The LCD device of claim 1, wherein each of the first inspection signal and the second inspection signal are voltage signals having the same level as a power voltage (VDD) or a ground voltage (VSS).

5. The LCD device of claim 1,
wherein the first inspection unit includes:
a $1\text{-}1^{th}$ transistor having a gate and a source connected to the first line;
a $1\text{-}1^{th}$ diode having an anode connected to a drain of the $1\text{-}1^{th}$ transistor, and having a cathode connected to the first node;
a $1\text{-}2^{th}$ transistor having a gate connected to the second line, and having a source connected to the first line; and
a $1\text{-}2^{th}$ diode having an anode connected to a drain of the $1\text{-}2^{th}$ transistor, and having a cathode connected to the first node, and
wherein the second inspection unit includes:
a $2\text{-}1^{th}$ transistor having a gate and a source connected to the second line;
a $2\text{-}1^{th}$ diode having an anode connected to a drain of the $2\text{-}1^{th}$ transistor, and having a cathode connected to the second node;
a $2\text{-}2^{th}$ transistor having a gate connected to the first line, and having a source connected to the second line; and
a $2\text{-}2^{th}$ diode having an anode connected to a drain of the $2\text{-}2^{th}$ transistor, and having a cathode connected to the second node.

6. An inspection method of a liquid crystal display (LCD) device having an inspection circuit unit on an LC panel, the inspection circuit unit formed between gate lines of the LC panel and a gate driving unit, and the inspection circuit unit configured to output gate driving signals in an alternating manner in the unit of odd-numbered or even-numbered gate lines, in correspondence to inspection control signals in an inspection mode, the method comprising:
applying a first inspection signal to first nodes connected to the odd-numbered gate lines for a ½ frame;
applying full-gray data signals to data lines connected to pixels corresponding to a single color, among pixels connected to the odd-numbered gate lines;
applying a second inspection signal to a second nodes connected to the odd-numbered gate lines for a ½ frame; and
applying full-gray data signals to data lines connected to the pixels corresponding to a single color, among pixels connected to the even-numbered gate lines.

* * * * *